United States Patent
Weir et al.

(10) Patent No.: US 6,871,811 B2
(45) Date of Patent: Mar. 29, 2005

(54) FILM CARTRIDGE INCLUDING LIGHT BLOCKING FABRIC

(75) Inventors: Matthew G Weir, Spartanburg, SC (US); Robert D Miller, Piedmont, SC (US)

(73) Assignee: Milliken & Company, Spartanburg, SC (US)

( * ) Notice: Subject to any disclaimer, the term of this patent is extended or adjusted under 35 U.S.C. 154(b) by 0 days.

(21) Appl. No.: 10/206,442

(22) Filed: Jul. 26, 2002

(65) Prior Publication Data

US 2004/0016839 A1 Jan. 29, 2004

(51) Int. Cl.[7] .................. G03B 23/02; G11B 23/107; B65D 85/67
(52) U.S. Cl. .................. 242/348.4; 428/95; 428/96; 206/389
(58) Field of Search .................. 242/348.4, 538.4, 242/588.5; 428/95, 96; 206/389

(56) References Cited

U.S. PATENT DOCUMENTS

| | | | |
|---|---|---|---|
| 4,103,054 A | 7/1978 | Okamoto et al. | 428/91 |
| 4,568,590 A | 2/1986 | Iwai | 428/85 |
| 4,730,778 A | 3/1988 | Akao et al. | 242/68.7 |
| 5,205,506 A | 4/1993 | Mizuno et al. | 242/71.1 |
| 5,217,179 A | 6/1993 | Sugiyama | 242/71.1 |
| 5,219,128 A | 6/1993 | Mizuno | 242/71.1 |
| 5,234,176 A | 8/1993 | Mizuno | 242/71.1 |
| 5,246,521 A * | 9/1993 | Shimura et al. | 156/251 |
| 5,271,983 A | 12/1993 | Ise et al. | |
| 5,275,283 A * | 1/1994 | Akao | 242/348.4 |
| 5,308,009 A | 5/1994 | Mizuno | 242/71.1 |
| 5,358,198 A | 10/1994 | Lesley | 242/348.4 |
| 5,368,664 A * | 11/1994 | Sugiyama et al. | 156/69 |
| 5,851,743 A * | 12/1998 | Akao | 430/501 |
| 5,860,613 A | 1/1999 | Holland | 242/348.4 |
| 2002/0022425 A1 * | 2/2002 | Tsurumaki et al. | 442/352 |
| 2003/0072910 A1 | 4/2003 | Tsurumaki et al. | |
| 2003/0192973 A1 * | 10/2003 | Turumaki et al. | 242/348.4 |

FOREIGN PATENT DOCUMENTS

| | | | | |
|---|---|---|---|---|
| JP | 62027733 A * | 2/1987 | | G03C/3/00 |
| JP | 62071949 A * | 4/1987 | | G03C/3/00 |
| JP | 02072348 A * | 3/1990 | | G03C/3/00 |
| JP | 05303171 A * | 11/1993 | | G03C/3/00 |
| JP | 06175290 A * | 6/1994 | | G03C/3/00 |
| JP | 06301158 A * | 10/1994 | | G03C/3/00 |
| JP | 2002129478 A * | 5/2002 | | D06M/15/333 |

\* cited by examiner

*Primary Examiner*—Cheryl A. Juska
(74) *Attorney, Agent, or Firm*—Terry T. Moyer; Jeffry E. Bacon (57) ABSTRACT

A film container incorporating a light-blocking pile fabric composite disposed in bounding relation to a slit opening in the container. The pile fabric composite includes a heat curable resilient polymeric stiffening primer disposed across the underside of a pile fabric and a layer of substantially solvent free, heat activatable adhesive disposed below the primer and bonded to a bare or coated surface of black pigmented polyvinyl acetate of the container.

7 Claims, 5 Drawing Sheets

FILM CARTRIDGE INCLUDING LIGHT BLOCKING FABRIC

FIELD OF THE INVENTION

This invention relates to containers for light-sensitive strip or sheet materials. More particularly, the invention is concerned with such containers having an elongated opening through which the strip or sheet material may be withdrawn, with a strip of light-locking material on each side of the opening for preventing visible light from entering the container. The invention also relates to a light-lock material for such containers incorporating volatile free adhesive and a method for making such a light-lock material.

BACKGROUND

Containers for light-sensitive strip or sheet materials, especially those for photographic films and papers are known. By way of example, such containers are illustrated and descried in U.S. Pat. No. 5,860,613 to Holland the teachings of which are incorporated by reference as if fully set forth herein. Such containers commonly comprise an elongated opening or slit through which the strip or sheet material of film is withdrawn from the container. To prevent visible light from entering the container and prematurely exposing the light-sensitive material, light-locking or light-shielding members long have been provided on either side of the opening, between which the material is drawn.

SUMMARY

The present invention provides advantages and alternatives over the prior art by providing an improved light locking material and associated container for light sensitive materials.

According to one aspect of the present invention, a film container is provided incorporating a light-blocking pile fabric composite disposed in bounding relation to a slit opening in the container. The pile fabric composite includes a resilient polymeric stiffening primer such as SBR (styrene-butadine rubber) latex or the like disposed across the underside of a pile fabric and a layer of substantially solvent free, heat activatable adhesive such as EVA (ethylene vinyl acetate) or the like disposed below the primer and bonded to a bare or coated surface of a metal container.

According to another aspect of the invention, a multi-layer pile fabric composite of improved cutability and adhesive bonding character is provided for disposition in bounding relation to a slit opening in a film container. The pile fabric composite includes a resilient polymeric stiffening primer such as SBR latex or the like disposed across the underside of a pile fabric and a layer of substantially solvent free heat activatable adhesive such as EVA or the like disposed below the primer and bonded to a coated or bare metal support surface.

BRIEF DESCRIPTION OF THE DRAWINGS

The accompanying drawings which are incorporated in and which constitute a part of this specification illustrate an exemplary embodiment of the present invention and together with the detailed description set forth below serve to explain the principles of the invention wherein.

DESCRIPTION OF PREFERRED EMBODIMENTS

Figure 1:
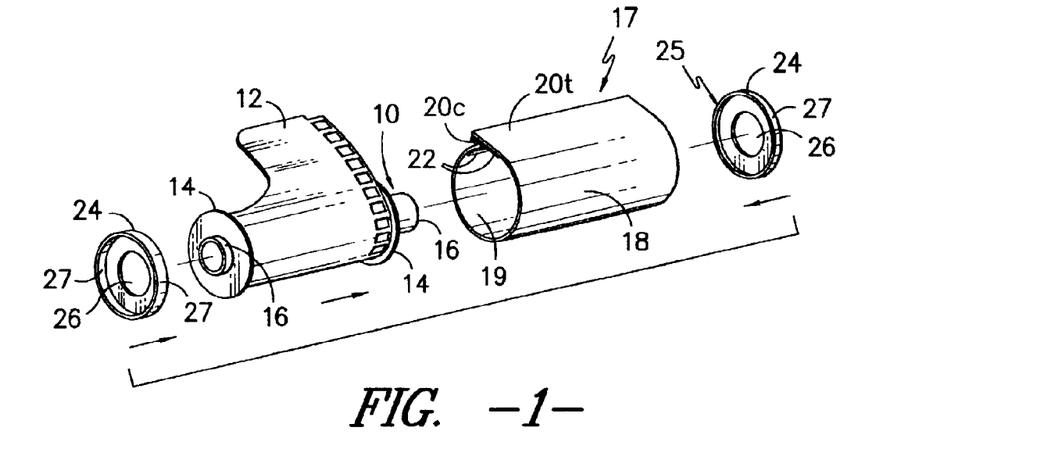
FIG. 1 is an exploded perspective view of a film container including strips of light-locking material.
Figure 2:
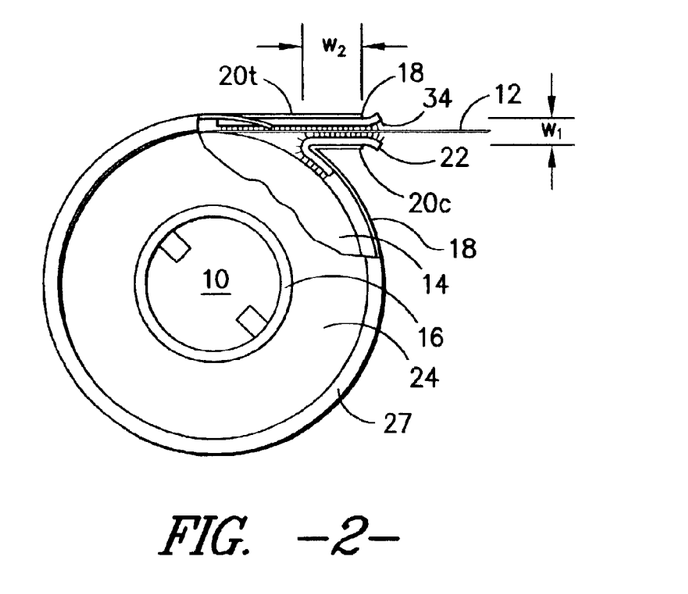
FIG. 2 is an end view, partially broken away, of a film container illustrating an egress slot bounded by strips of light-locking material.

FIGS. 1 and 2 illustrate an exemplary photographic film container which includes light-locking fabric members. In the illustrated embodiment, a spool 10 includes a central core on which is wound a strip 12 of photographic film. Spool 10 includes a pair of end flanges 14 from which extend hollow axial hubs 16. A shell 17, molded into a cylindrical or other suitable geometry from a preformed sheet 18 (FIG. 3), comprises a pair of axially extending lips 20c, 20t between which an elongated opening or slit is defined in the completed container for withdrawal of the strip 12. These axially extending lips, 20c, 20t, may be different in geometry. In the exemplary construction shown in FIGS. 2 and 3A, lip 20c is folded or crimped back on itself with lip 20t being essentially tangent to the cylindrical surface of the shell 17.

Figure 3:
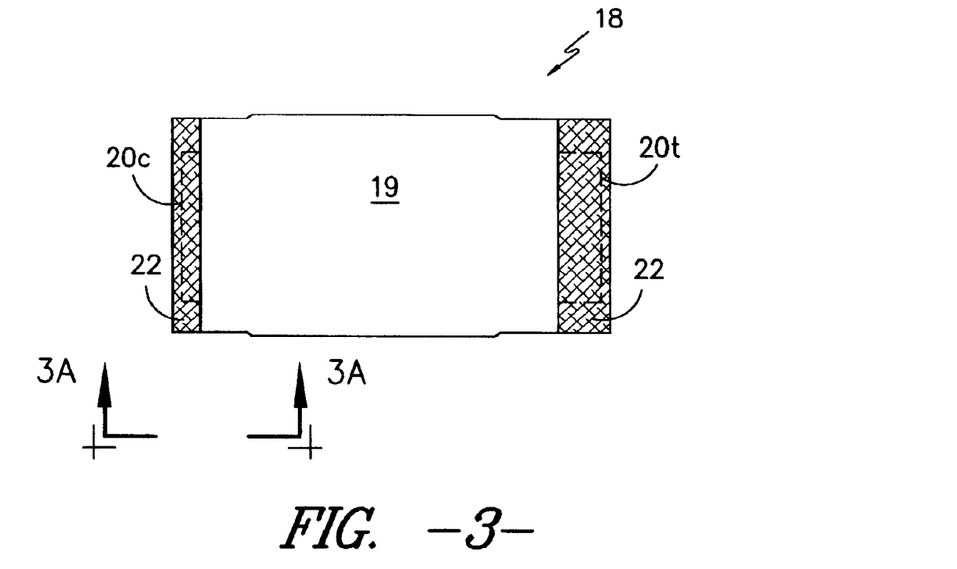
FIG. 3 is an elevation view of a metal blank with attached strips of light-locking material disposed along lateral edges for forming a shell portion of a film container.

FIG. 3 illustrates a surface 19 of the preformed sheet 18 forming the interior of the cylindrical shell 17. As shown, in the illustrated configuration the preformed sheet 18 is formed from a substantially rectangular blank of metal such as steel or the like on which lips 20c, 20t previously have been formed. If desired, the surface 19 forming the interior of the shell 17 may be treated with an opacifying coating 21 (FIG. 3A) such as black pigmented PVA (polyvinyl acetate). The preformed sheet 18 also includes the strips 19 at opposite edges of the preformed sheet 18 on the interior surface 19 coinciding with the lips 20c, 20t. As will be appreciated, in the figures the thickness of various layers, including the coating 21, is exaggerated and not necessarily to scale in order to aid in an understanding of the invention.

To prevent leakage of light into the container, the opposed inner faces of lips 20c, 20t are covered with strips 22 of light-locking material such as a pile fabric composite which gently but firmly engages the surfaces of the film and prevents light leakage into the container. Such light-locking materials may be made from various fabrics and are sometimes called teremp cloths. The fabrics are preferably black to improve their imperviousness to visible light and are preferably sufficiently compressible so as not to scratch or otherwise damage the film when it is withdrawn from or rewound into the container. The ends of the shell 17 are closed by a pair of annular end caps 24, each having an aperture 26 for rotatably receiving a hub 16 and a circumferentially extending groove 25 and flange 27 for fixedly engaging the end edges of the shell formed from the preformed sheet 18.

The container is assembled by inserting a spool 10 prewound with film 12 axially into the shell 17 formed from the performed sheet 18, and then applying end caps 24. As shown in FIG. 2, when the caps are applied, strips 22 are compressed against the lead portion of the film 12 so that the light-locking material of strips 22 is compressed to establish a slot gap of width W1 between the opposed inner faces of lips 20c, 20t. The area of compressed contact between strips 22 has a width W2 in the direction of withdrawing the film 12. On the outside surface of caps 24, the walls of groove 25 define axially and peripherally extending flange 27 whose radically inner surface is deformed outwardly to stake the end cap 24 to the cylindrical shell 17.

The strips 22 preferably include a pile fabric 29 including a plurality of outwardly projecting pile fibers 34 (FIG. 5) defining a contact surface for the film 12 as it is withdrawn. It is contemplated that the pile fabric 29 within the strips 22 may be formed by any number of practices as will be known to those of skill in the art. By way of example, it is contemplated that pile fabric 29 may be formed by napping and shearing a woven or knitted fabric, weaving a velour, tufting or bonding a pile to a substrate, producing a double layer sandwich structure with yarns traversing between the layers and thereafter slitting between the sandwich layers, and other techniques for forming a pile as may be known.

Figure 4:
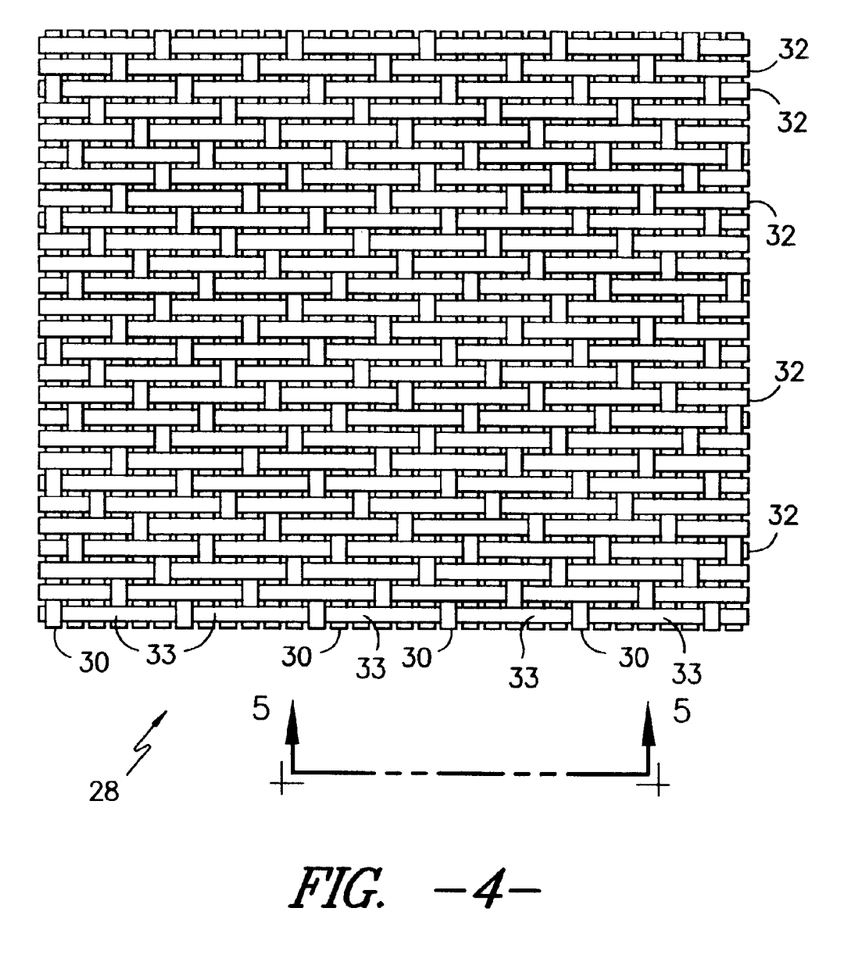
FIG. 4 is a schematic surface view of an exemplary preliminary fabric prior to pile raising.
Figure 5:
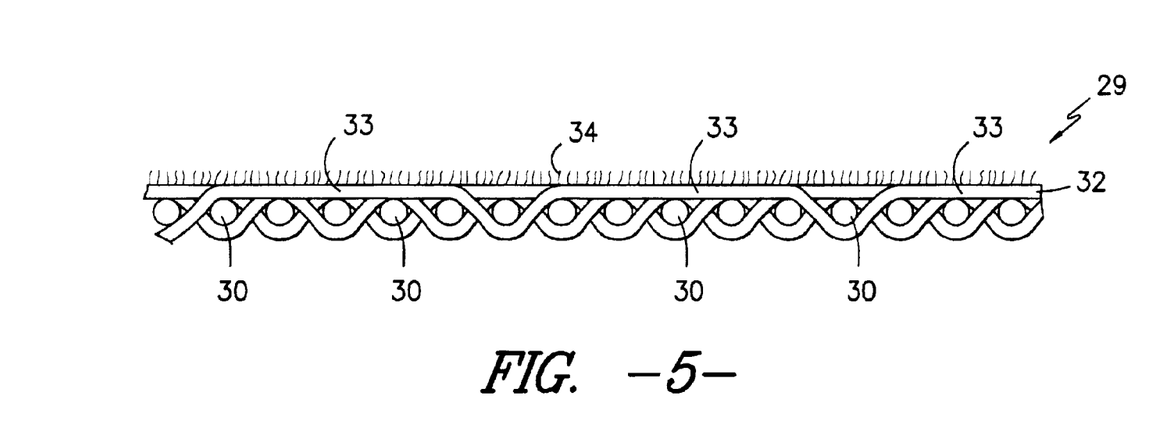
FIG. 5 is a view taken generally along line 5—5 in FIG. 4 after pile raising.

By way of example only and not limitation, in FIG. 4 there is illustrated a preliminary woven fabric 28 having warp yarns 30 and weft yarns 32 for forming a light-locking material. Each weft yarn 32 comprises floats 33 which extend across a plurality of underlying warp yarns 30 with the floats preferably shifting at least two warp yarns in the weft direction on each successive row. Of course, it is to be appreciated that other weave patterns could also be used. According to one exemplary practice, the fabric 28 after being woven is taken in wide widths from the weaving machine and successively dyed, dried, napped, sheared and heat set to produce the desired light-locking pile fabric 29 (FIG. 5). According to this practice, the pile fibers 34 are raised by napping and shearing floats 33 of fabric 28 to provide the light-locking pile fabric 29.

According to one exemplary practice, the fabric 28 used to form the pile fabric 29 includes a base cloth of intermeshed or entangled yarns and float yarns on a surface of the base cloth, the floats being napped and sheared to raise fibers therefrom to prevent light from entering the container of light sensitive material. In one exemplary construction the fabric 28 is 100% woven polyester formed in a six shaft filling face satin weave from a singles textured warp yarn 30 of 150 denier, 33–48 filaments and a two-ply twenties spun weft yarn 32 of 1.5 denier of 1.5 inch (38.1 mm) staple length.

If it is desired to eliminate dyeing and drying of the woven fabric prior to napping and shearing, solution dyed polyester warp and fill yarn can be employed. For example, warp yarn 30 can be singles textured, 150 denier, 33 filament black polyester and weft yarn 32 can be two-ply twenties, 1.5 denier of 2.0 inch (50.8 mm) staple length black polyester fiber. Solution dyed fabrics may provide a reduced tendency for reaction between the dyes in the light-lock material and the chemical constituents of photographic film or paper.

Figure 6:
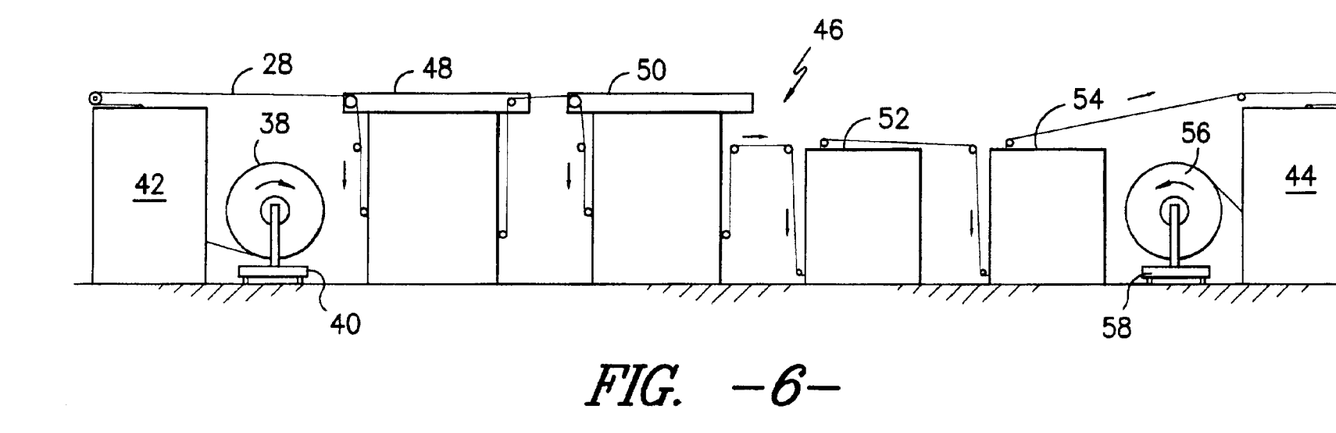
FIG. 6 is a schematic representation of a process line for raising the pile across the fabric in FIG. 5.

As indicated, in one contemplated practice fabric 28 is subjected to a napping and shearing procedure to produce the pile fabric 29 shown in FIG. 5. FIG. 6 illustrates schematically an exemplary pile raising line 46 for raising the pile fibers 34. According to the illustrated practice, the fabric 28 is supplied from take-up roll 38 on a roll stand 40 in sequence to accumulator 42; to a first napper 48; to a second napper 50; to a first shearer 52; to a second shearer 54; to accumulator 44 and, after napping and shearing, to take-up roll 56 on roll stand 58. As will be appreciated, the accumulators 42, 44 serve to accumulate fabric therein to compensate for variations in roll speed and web tension as well as momentary stops of the machinery.

It should be noted that fabric 28 on each pass through the pile raising line 46 goes through at least two nappers and then through at least two shearers. It has been found that to provide an efficient light-locking material, the fabric should be run through the napping and shearing arrangement at least twice and preferably three times or more to provide the proper density and height of the pile fibers 34 and to prevent rowing or some other repeating effect on the fibers 34. By "rowing" is meant the formation of extended open surface slots or rows between lines of piles, through which visible light may leak. Then, since take-up roll 56 on the outlet end of each pass is placed in the supply roll stand 40 for the next pass through napping and shearing arrangement 46, the surface of the fabric is run through the arrangement in a direction opposite to the previous run in order to equalize the effect of the napping and shearing operations. It is to be understood that the napping and shearing operations may be carried out using any number of different equipment configurations including those in U.S. Pat. No. 5,860,613 to Holland and that such napping and shearing equipment forms no part of the present invention.

Once the pile fibers 34 have been raised across the surface of the pile fabric 29, the pile fabric 29 is subjected to a series of coating operations to impart stiffness and adhesion characteristics across the pile fabric 29. As best illustrated through reference to FIG. 7, the pile fabric 29 is coated with a primer layer 62 of elastomeric polymer across the side of the pile fabric 29 facing away from the pile fibers 34. In practice, the primer layer 62 is preferably a synthetic elastomeric polymer such as heat curable SBR (styrene-butadiene rubber) latex or the like which provides stiffness without embrittlement. One suitable SBR latex formulation is believed to be available under the trade designation TA4346 from Tanner Chemicals Inc. (a division of Sovereign Specialty Chemicals) having a place of business in Greenville, S.C. Aside from SBR latex, it is also contemplated that other materials may also be used to form the primer layer 62. By way of example only and not limitation, one such material is an aqueous dispersion of ethylene acrylic acid (EAA) incorporating a thickening agent such as ammonia or the like. Such a material is believed to be available under the trade designation MICHEM 4983R from Michelman Inc. having a place of business in Cincinnati Ohio. Still another formulation which may be used to form the primer layer 62 is a blend of ethylene acrylic acid and methyl acrylate with an added thickening agent such as ammonia or the like. Such a material is believed to be available under the trade designation MILLITEX PD75 from Milliken & Company—Chemicals Division having a place of business in Spartanburg, S.C. As will be appreciated, each of these materials are characterized by a substantial absence of volatile organic compounds and is heat curable to a dimensionally stable condition providing stiffness across the pile fabric 29 while nonetheless retaining resiliency.

Figure 7:
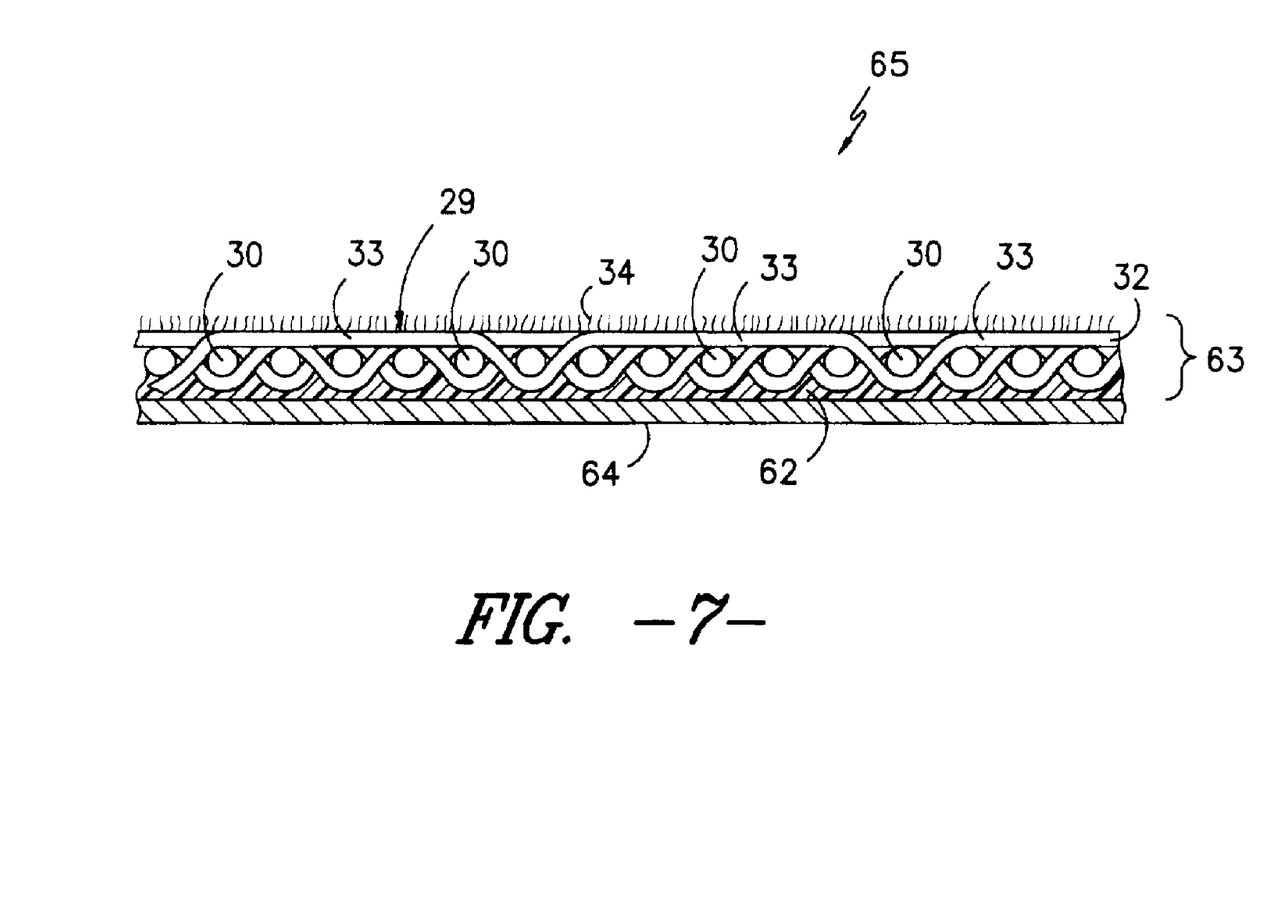
FIG. 7 is a view similar to FIG. 5 after application of a primer layer and adhesive undercoat to the fabric in FIG. 5.

Aside from providing controlled stiffness, the primer layer 62 of elastomeric polymer also provides a compatible base for application of an underlying adhesive layer 64 used to secure the fabric to the surface 19 of the preformed sheet 18. In particular, it has been found that the use of suitable primer layer materials provides the ability to use substantially solvent free heat activated adhesives such as adhesives based on ethylene vinyl acetate copolymer (EVA) adhesive systems or the like.

According to an exemplary practice using SBR to form the primer layer 62, an SBR latex composition is cast across the underside of the pile fabric 29 as described above by knife coating or other suitable application technique as may be known to those of skill in the art and cured to yield a primer layer 62 with a mass per unit area in the range of about 0.9 to about 1.1 ounces per square yard and most preferably about 1 ounce per square yard. As indicated above, the resulting intermediate coated fabric 63 comprising the pile fabric 29 with the applied primer layer 62 has a controlled degree of stiffness to facilitate subsequent additional coating and cutting treatments without being brittle. Preferably, the pile fabric 29 in which the pile 34 has been raised and with the applied primer layer 62 has a Handle-O-Meter stiffness in the range of about 50 grams to about 250 grams and more preferably about 70 grams when tested according to ASTM standard D2923-95 pulling the fabric through a 20 mm slot opening.

Following the application and curing of the primer layer 62 at the desired level, the pile fabric 29 with applied primer layer 62 is preferably passed through a corona treatment as will be well known to those of skill in the art to oxidize the primer so as to facilitate adhesion between the primer layer 62 and an underlying adhesive layer 64. It is also contemplated that heat may be applied to the pile fabric 29 with applied primer layer 62 to reduce the temperature differential in subsequent coating operation. Such heat application may be particularly desirable if no corona treatment has been utilized.

According to one exemplary practice, following corona and/or heat treatment the pile fabric 29 with applied primer layer 62 is passed to an extrusion coater as will be well known to those of skill in the art for application of the adhesive layer 64. As will be appreciated by those of skill in the art, extrusion coating involves the process of extruding a molten film from a die and contacting the molten film with a contact substrate under pressure between two counter-rotating rolls. One of these rolls (referred to as the chill roll) is in contact with the surface being coated while the other roll (referred to as the nip roll) is a rubber or other deformable material supporting the side remaining uncoated. Through use of such a configuration, a layer of molten EVA or other meltable adhesive is spread across and forced against the underside of the primer layer 62. According to a potentially preferred practice, the molten EVA is preferably applied at a temperature of about 440 degrees Fahrenheit while the chill roll is held at a temperature of about 55 to about 65 degrees Fahrenheit.

According to the contemplated practice, the EVA composition is substantially solvent free and is attachable to the surface of the preformed metal sheet 18 by heat rather than by solvent activation. In this regard it is to be understood that by the term "solvent free" is meant that the adhesive is substantially free of so called volatile organic compounds. The EVA preferably has a vinyl acetate monomer content of at least about 30% by weight and more preferably at least about 33% by weight. Such vinyl acetate contents promote a relatively low softening point which aids in thermal activation for attachment to the underlying substrate. Preferably, the EVA has a melt index measured according to ASTM Standard D-1238 in the range of about of about 25 to about 60 grams/10 minutes and more preferably about 35–45 grams/10 minutes and most preferably about 41 grams/10 minutes. One suitable adhesive composition is a substantially solvent free EVA composition marketed under the trade designation ELVAX 3185 by DuPont Corporation having a place of business in Wilmington, Del.

The EVA is preferably blended with a light absorbing pigment to eliminate reflection. By way of example only and not limitation, one light absorbing pigment as may be used is carbon black marketed under the trade designation #27830 by Standridge Color Corporation having a place of business in Social Circle, Ga. The carbon black is preferably present at a level of about 0.5 to about 2% by weight of the total (adhesive plus pigment) and more preferably at a level of about 1 to about 1.5% by weight of the total and most preferably about 1.25% by weight of the total. The resulting multi-layer composite 65 following extrusion coating of the adhesive layer 64 is illustrated schematically in FIG. 7.

According to a potentially preferred practice, in the finished construction the adhesive layer 64 of EVA and carbon black is present at a mass per unit area in the range of about 1.6 to about 3 ounces per square yard and more preferably, about 2 to about 2.7 ounces per square yard and most preferably about 2.3 ounces per square yard. Preferably, the final multi-layer composite 65 including the adhesive layer 64 has a Handle-O-Meter stiffness in the range of about 110 grams to about 380 grams and more preferably about 140 grams to about 180 grams and most preferably about 160 grams when measured according to ASTM Standard D2923-95 pulling the sample through a 20 mm slot opening.

Figure 3A:
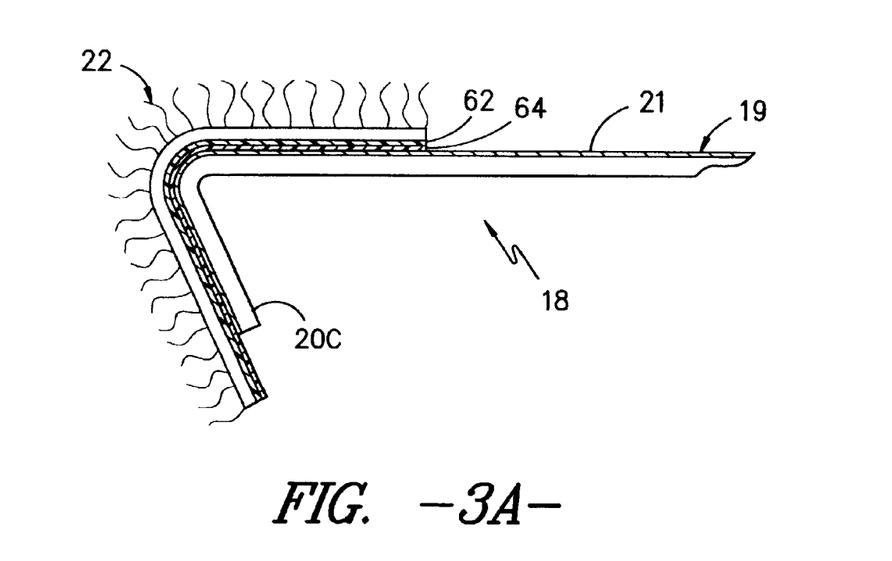
FIG. 3A is an edge view taken along line 3A—3A in FIG. 3.

An adhesive layer 64 of EVA as described above is believed to be particularly beneficial in obtaining adhesion to a coating 21 of PVA on the surface 19 of the preformed sheet 18, to which the coated fabric 22 is to be attached.

It is also contemplated that other substantially solvent free adhesives may also be utilized. By way of example only, and not limitation, one alternative adhesive as may be utilized is an Ethylene Methyl Acrylate adhesive marketed under the trade designation OPTEMA TC120 by Exxon Mobile Corporation having a place of business in Houston, Tex. Still another alternative solvent free adhesive which may be utilized is an ionomer resin marketed under the trade designation SURLYN Grade 1652-1 by DuPont Corporation in Wilmington, Del. Of course, it is contemplated that other solvent free adhesives may also be utilized.

According to one contemplated practice for production of the film canister, the coated fabric composite 65 is slit in the warp direction to provide ribbons having a width or widths suitable for installation on the opposed inner faces of lips 20c, 20t, with the warp direction of the fabric 29 running axially along the lips (i.e. along the short sides of the preformed sheet 18). The fabric composite 65 may be slit in any convenient manner. However, slitting ultrasonically produces clean cut edges.

The preformed sheet 18 may be part of an elongate metal ribbon structure with cut outs along the lateral edges corresponding to the desired lip geometry. Strips of the coated fabric composite 65 can thus be subjected to heating to selectively activate the adhesive layer 64. Since the adhesive layer 64 is substantially solvent free, the heating does not give rise to any potentially undesirable evolution of volatile organic compounds. The strips of fabric composite 65 can be laid down in adhering relation along the lateral edges of the preformed metal sheet 18 such that a bonding relation is established between the activated adhesive and lateral edges of the preformed metal sheet 18. A stamping or shearing operation can then be used to segment the individual preformed sheets 18 along with cooperating segments of the coated fabric.

As will be appreciated, the character of the adhesive layer 64 is preferably such that a secure bonding relation is established and maintained with the PVA or other coating 21 as may be disposed across the surface 19. Likewise, the character of the primer 62 is preferably such that it bonds to the underlying adhesive 64 and does not lose substantial stiffness during the heat activated bonding process.

The present invention may be further understood by reference to the following non-limiting examples:

EXAMPLE 1

Production of Exemplary Pile Composite

A polyester fabric was woven on a Picanol Omni airjet weaving machine. The warp yarn was 150 denier textured polyester. The filling yarn was 20/2 ring spun polyester. The fabric was constructed in a satin weave, leaving floats on the surface where the floats cross at least two warp yarns in a successive row. Following weaving, the floats of yarn on the surface of the fabric were treated by napping and shearing to raise pile fibers away from the surface. The napping was carried out by running the fabric over a series of wire coated brushes running counterclockwise to the fabric direction. This action causes the yarn to break apart thus creating pile in the form of an arrangement of broken yarn and fiber bundles. The fabric was then sheared to a consistent pile height of about 0.087 inches.

Following napping and shearing, the resulting pile fabric was backcoated with an SBR latex rubber, TA4346 on a Monfort tenter frame. The backcoating weight was in the range of 0.9 to 1.1 oz/sq yd and was dried at a temperature in the range of about 360 degrees Farenheit. The fabric was then coated using an Egan extrusion coating line (available from Davis-Standard Corp., of Pawcatuck, Conn.) with a melt-extrudable thermoplastic on the side opposite the pile. The thermoplastic utilized was ELVAX 3185 ethylene vinyl acetate (EVA) copolymer. The coating was applied at a thickness of 3.3 mils (82.5 microns) or a total weight of 49.2-lbs/3000 ft$^2$(2.36 oz/yd$^2$). The thermoplastic coating contained 1% carbon black pigment added to opacify the coating. The coating was applied by extrusion coating at a melt temperature of 440° F. and a melt pressure of 500 psi. The chill roll temperature was kept at 55° F. Prior to extrusion coating, the fabric was subjected to corona discharge treatment.

Following application of the thermoplastic coating, the coated substrate was slit into ribbons approximately ⅜ inch in width using an ultrasonic unit available from Branson Ultrasonics of Danbury, Conn. The fabric ribbons were wound onto plastic spools for subsequent application to metal film canisters.

EXAMPLES 2 AND 3

Comparative Bonding Strength of Adhesives to PVA Coated Metal

A first light-blocking ribbon material was formed in accordance with Example 1 with an SBR latex primer and an EVA adhesive backing. A second light-blocking ribbon material was formed for comparison having an acrylic latex primer and a solvent based poly(vinyl acetate) adhesive backing. Equivalent levels of adhesive were used in each of the samples. The samples tested for peel strength relative to a standard piece of PVA coated steel film canister. Each of the ribbons was slit to ⅜ of an inch in width. A piece of ribbon 24 inches long was heat-sealed to a flat piece of the standard PVA coated steel film canister using a bench-top heat-seal machine (available from Sencorp Systems Inc., Hyannis, Mass.). The ribbon was sealed at a temperature of 415° F., a pressure of 13 psig and a cycle time of 0.3 seconds. The entire sample was then placed into an MTS Q-Test 25 tensile testing machine (available from MTS Systems Corp. of Research Triangle Park, N.C.). One end of the steel canister was placed in the lower jaws of the tensile tester and the free end of the ribbon was placed in the upper jaws of the tensile tester so that the ribbon was peeling off the steel film canister at a 180° angle. Each sample was tested ten minutes after heat-sealing the ribbon to the steel film canister. The ribbon was pulled at a constant rate of 12 in/min. An average was taken for multiple peel tests on ribbons of each material. The results of the peel test are provided in Table I.

TABLE I

| Example Number | Description | Average Peel Adhesion (lbs/in) |
| --- | --- | --- |
| 2 | PVA Coated Substrate | 1.95 |
| 3 | EVA Coated Substrate | 3.47 |

EXAMPLES 4–7

Comparative Peel Adhesion and Composite Stiffness with Variable Primer Level Two levels of styrene-butadiene rubber (SBR) latex primer were applied to the fabric described in detail in Example 1 using the same process described in Example 1. The samples were then extrusion coated with various levels of the same ethylene vinyl acetate (EVA) copolymer. Peel adhesion was measured for multiple ribbon segments of each sample using the procedure as set forth with respect to Examples 2 and 3 above and averages were calculated. Cantilever stiffness of the composite was measured for multiple segments of each sample using ASTM standard D1388-96 and averages were calculated. The results are set forth at Table II.

TABLE II

| Example Number | Primer Add-On (oz/yd$^2$) | Adhesive Level (oz/yd$^2$) | Peel Adhesion (lbs/in) | Cantilever Stiffness (mm) |
| --- | --- | --- | --- | --- |
| 4 | 1.0 | 1.57 | 1.39 | 10.6 |
| 5 | 1.0 | 3.04 | 4.76 | 11.6 |
| 6 | 1.3 | 1.80 | 0.73 | 12.4 |
| 7 | 1.3 | 2.21 | 2.39 | 11.2 |

It is to be understood that while the present invention has been illustrated and described in relation to potentially preferred embodiments, constructions and practices, that such embodiments, constructions and practices are intended to be illustrative only and that the invention is in no event to be limited thereto. Rather, it is contemplated that modifications and variations embodying the principles of the present invention will no doubt occur to those of skill in the art and it is therefore contemplated and intended that the present invention will extend to all such modifications and variations as may incorporate the broad principles of the present invention.

What is claimed is:

1. A container for holding a strip or sheet of light sensitive material, the container comprising:
   a shell molded from a blank of metal disposed in substantially surrounding relation to said light sensitive material, wherein said shell includes an inner surface having a coating of black pigmented polyvinyl acetate, said shell further including a slit defined by a pair of substantially opposing outwardly projecting lips in spaced apart relation for withdrawal of said light sensitive material, such that portions of said inner surface form opposing surfaces of said lips; and at least one strip of light-blocking material of multi-layer construction attached to each of said lips, wherein said light blocking material comprises a pile fabric having a pile face comprising a plurality of outwardly projecting pile fibers, a layer of heat curable polymeric stiffening primer disposed across the underside of said fabric facing away from said pile face, and a layer of heat activatable polymeric adhesive extending away from said heat curable polymeric stiffening primer and in adhesive attachment to said coating of polyvinyl acetate at said opposing surfaces of said lips such that pile fibers of said pile face project away from each of said lips at least partially across said slit.

2. The invention according to claim 1, wherein said heat curable polymeric stiffening primer comprises styrene-butadiene rubber latex.

3. The invention according to claim 2, wherein said styrene-butadiene rubber latex is disposed across the underside of said pile fabric at a mass per unit area of about 0.9 to about 1.1 ounce per square yard.

4. The invention according to claim 2, wherein said layer of heat activatable polymeric adhesive comprises ethylene vinyl acetate characterized by a vinyl acetate content of about 30% or greater by weight and a melt index measured according to ASTM Standard D-1238 in the range of about of about 25 to about 60 grams/10 minutes.

5. The invention according to claim 4, wherein said layer of heat activatable polymeric adhesive is disposed across the underside of said pile fabric at a mass per unit area of about 1.6 to about 3 ounces per square yard.

6. The invention according to claim 4, wherein said layer of heat activatable polymeric adhesive further comprises about 1% by weight carbon black.

7. A container for holding a strip or sheet of light sensitive material, the container comprising:

a shell molded from a blank of metal disposed in substantially surrounding relation to said light sensitive material, wherein said shell includes an inner surface having a coating of black pigmented polyvinyl acetate, said shell further including a slit defined by a pair of substantially opposing outwardly projecting lips in spaced apart relation, such that portions of said inner surface form opposing surfaces of said lips; and at least one strip of light-blocking material of multi-layer construction attached to each of said lips, wherein said light blocking material comprises a pile fabric having a pile face comprising a plurality of outwardly projecting pile fibers, a layer of heat curable styrene-butadiene rubber latex disposed across the underside of said fabric facing away from said pile face, and a heat activatable adhesive layer of ethylene vinyl acetate adhesive blended with an opacifying agent disposed below said stiffening primer and in adhesive attachment to said coating of polyvinyl acetate at said opposing surfaces of said lips such that pile fibers of said pile face project away from each of said lips at least partially across said slit, wherein the ethylene vinyl acetate adhesive is characterized by a vinyl acetate content of about 30% or greater by weight and a melt index measured according to ASTM Standard D-1238 in the range of about of about 25 to about 60 grams/10 minutes and wherein the heat activatable adhesive layer is present at a mass per unit area of about 1.6 to about 3 ounces per square yard.

* * * * *